(12) United States Patent
Wardega

(10) Patent No.: US 8,531,740 B1
(45) Date of Patent: Sep. 10, 2013

(54) UNIVERSAL SCANNING STAND FOR DEVICES EQUIPPED WITH A DIGITAL CAMERA

(76) Inventor: Tomasz Wardega, Brecksville, OH (US)

(\*) Notice: Subject to any disclaimer, the term of this patent is extended or adjusted under 35 U.S.C. 154(b) by 73 days.

(21) Appl. No.: 13/402,871

(22) Filed: Feb. 23, 2012

(51) Int. Cl.
*H04N 1/04* (2006.01)

(52) U.S. Cl.
USPC ............ 358/474; 358/498; 358/497; 358/473

(58) Field of Classification Search
USPC .................... 358/474, 498, 497, 473, 505
See application file for complete search history.

(56) References Cited

U.S. PATENT DOCUMENTS

| | | | |
|---|---|---|---|
| 4,574,316 A | 3/1986 | Wilman | |
| 5,640,252 A * | 6/1997 | Turner et al. | 358/497 |
| 6,540,415 B1 | 4/2003 | Slatter | |
| 6,611,362 B2 * | 8/2003 | Mandel et al. | 358/474 |
| 7,418,126 B2 | 8/2008 | Fujimoto | |
| 7,593,595 B2 | 9/2009 | Heaney, Jr. | |
| 7,595,915 B2 * | 9/2009 | Belkhir | 358/474 |
| 7,639,406 B1 | 12/2009 | Proudfoot | |
| 7,808,681 B2 | 10/2010 | Hatzav | |
| 2010/0038514 A1 | 2/2010 | Yu | |
| 2011/0267661 A1 | 11/2011 | Hayes | |

\* cited by examiner

*Primary Examiner* — Houshang Safaipour (57) ABSTRACT

One embodiment of a scanning stand for devices equipped with a digital camera comprising two inverted-V parts. One inverted-V part includes a sliding platform serving as a holder for a device equipped with a digital camera. Inverted-V parts are connected using nylon ribbons and the distance between inverted-V parts can be adjusted to accommodate documents of various thicknesses. A sheet of transparent acrylic or glass is included to provide means to flatten wrinkles or creases on documents and to straighten pages of bound material near the binding.

7 Claims, 7 Drawing Sheets

UNIVERSAL SCANNING STAND FOR DEVICES EQUIPPED WITH A DIGITAL CAMERA

BACKGROUND

Prior Art

Copy stands for positioning a digital camera relative to the document to be copied are well known in prior art. Various book scanning mechanisms utilizing a digital camera to capture images have also been developed.

U.S. Pat. No. 6,540,415 describes a document capture stand that facilitates the use of a digital camera as a document scanner. This stand requires adjustment of the height and position of the camera to place it over the scanned document. This stand does not address imaging of bound documents.

U.S. Pat. No. 7,639,406 describes systems and methods of imaging printed material utilizing a V-shaped cradle and digital cameras. The system and methods described are designed specifically for bound documents. The system does not appear to be portable or inexpensive. It also appears that only specific digital cameras can be used with this system.

US Pat. Application No 20110267661 describes a book scanner that contains a V-shaped platform to support bound materials laid open and a depressor to depress pages of the bound material flat against the platform. This book scanner appears to utilize a specific type of a digital camera.

Devices for capturing images of documents using digital cameras heretofore known suffer from several disadvantages:
 (a) Portable stands for capturing documents using digital cameras are not designed for imaging bound documents.
 (b) Stands for scanning bound documents are not very portable.
 (c) Scanning stands are not designed for use with a wide range of devices equipped with a digital camera.
 (d) The methods of capturing images of documents using these scanning stands rarely address post-processing of images using computer software like cropping to find page borders, rotation to position text properly for reading, re-sampling to make the image appear close to the natural size, re-ordering of pages etc.

SUMMARY

In accordance with one embodiment the scanning stand comprises two inverted-V parts and a camera positioning platform and combines the document stand and a camera stand into one simple apparatus that is foldable for easy storage.

DRAWINGS

Figures

In the drawings, closely related figures have the same number but different alphabetic suffixes.

DRAWINGS

Reference Numerals

1. Platform, front side of the stand
2. Platform, turning surface
3. Platform, imaging surface
4. Platform, rear side of the stand
5. Beam connecting bases of two platforms
6. Angle between platforms
7. A digital camera
8. Nylon ribbon
9. Sliding platform
10. Distance of up and down travel
11. Pegs
12. Gap between inverted-V parts
13. A book
14. Distance between the camera's lens and the imaging surface
15. Movement for closing platforms 1,2 and 3,4
16. Movement for closing the gap between tops of platforms 2 and 3
17. Movement for closing platforms 1,2 and 3,4, second method
18. Hole for inserting pegs
19. Cut-out in the platform
20. Tab
21. Vertical slots
22. Transparent sheet of acrylic or tempered glass
23. Page of a document
24. Small document 25. Direction of light
26. Field of view of the camera's lens
27. Direction of searching for the top edge
28. Direction of searching for the left and right edge
29-37 Steps of the scanning process

DETAILED DESCRIPTION

First Embodiment

Figure 1A:
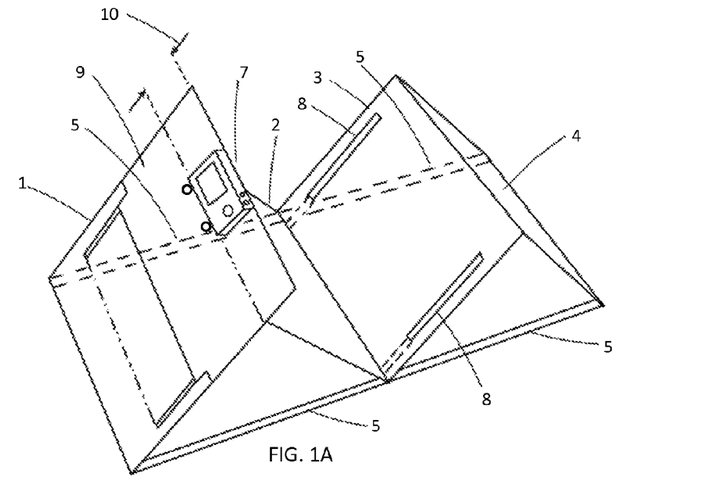
FIG. 1A is a perspective view of the first embodiment of the scanning stand that consists of two inverted-V parts and a sliding platform serving as a holder for a digital camera.

FIG. 1A is a perspective view of the first embodiment of my scanning stand that consists of two inverted-V parts and sliding platform 9 serving as a holder for a device with a digital camera. A sheet of transparent acrylic (not shown) is included with my stand to facilitate imaging of bound documents and documents with wrinkles or creases.

One inverted-V part of the stand, consisting of platforms 1 and 2 holds sliding platform 9 that serves as a holder for digital camera 7. This inverted-V part together with platform 9 constitutes the holding part of the stand.

The second inverted-V part of the stand consists of platforms 3 and 4—the page of the document that is imaged rests on platform 3. This inverted-V part is the imaging part of the stand and platform 3 is the imaging surface.

Platform 2 adjacent to the imaging surface 3 is the turning surface where already imaged pages of the document are turned.

In this embodiment platforms 1, 2, 3 and 4 have the same dimensions—33 cm wide by 28 cm high—this size of platforms is appropriate for imaging documents up to US letter paper size and international A4 paper size.

Platforms 1 and 2 are connected at the top in a hinged manner to allow folding and unfolding. Platforms 3 and 4 are also connected at the top in the same hinged manner to allow folding and unfolding. In this embodiment platforms 1, 2, 3 and 4 are matte black in color, in order to distinguish the platforms from the imaged document easily.

Bottoms of platforms forming each inverted-V part are connected by four removable beams 5 that slide into bases of platforms 1, 2, 3 and 4 when the stand is deployed for imaging document. Removable beams 5 are 33 cm long and 2.5 cm wide. The length chosen is the same as the width of platforms 1, 2, 3 and 4 in order to make it easy to store the beams together with the scanning stand once it is folded.

In this embodiment nylon ribbons 8 are permanently attached with glue to platform 2. Ribbons 8 pass under the base of platform 3 and through small slits close to the base of platform 3. The ends of ribbons 8 are attached to the surface of platform 3 using Velcro strips. The purpose of nylon ribbons 8 is to create or close opening 12 between two inverted-V parts of my scanning stand.

Figure 1B:
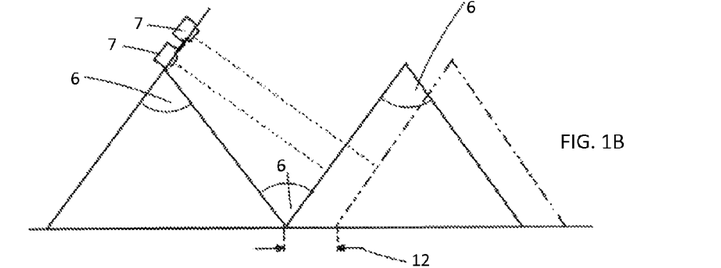
FIG. 1B is a schematic diagram illustrating how pairs of platforms leaning to the same side are parallel.
Figure 1C:
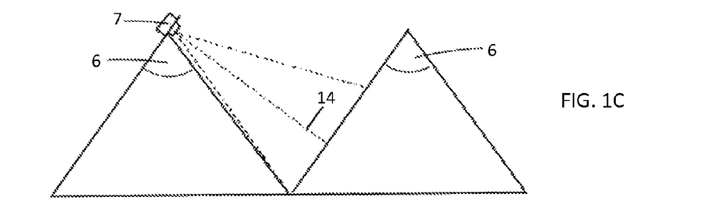
FIG. 1C is a schematic view illustrating the relation between the distance from the digital camera to the imaging platform and maximum size of the documents that may be scanned.
Figure 1D:
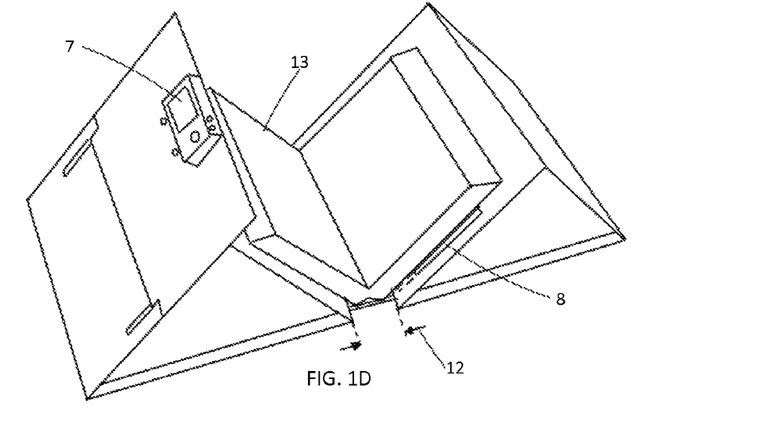
FIG. 1D is a perspective view of the first embodiment showing how the distance between two inverted-V parts of the stand can be adjusted to accommodate thick documents or books.

FIG. 1D illustrates opening 12 between the holding and the imaging part of the stand created by loosening ribbons 8, the width of the opening can be adjusted to place a thick document or a book. By creating opening 12, most of the weight of document or book 13 rests on the table or platform where the stand is placed. This allows to construct the stand using inexpensive and easy to work with materials like foam board, mat board or plastic.

FIG. 1B is a schematic diagram illustrating that pairs of platforms leaning to the right and left are parallel because all platforms in this embodiment have the same size and all beams 5 are of the same length. As a result a digital camera with its body resting flat on sliding platform 9 is parallel to the surface of a document. Movement 10 of sliding platform 9 allows adjusting the camera position up and down. Sliding platform 9 can slide down to be at the same height as top of platform 1 to facilitate folding and storage when the stand is not used.

FIG. 1B also illustrates that angle δ between platforms should be between approximately 60° and 90°. If the angle between platforms were less than 60° and the bottom of the camera's field of view were aligned with the bottom of the imaged document, then the lens of the camera would be pointing above the center of imaging surface 3. Consequently, the field of view would extend vertically above the top of platform 3 and this would have negative impact on the quality of the document image by bringing some objects outside of the platform into the picture. On the other hand, if angle 6 were larger than 90°, sliding platform 9 would have to be extended significantly above the top edge of platform 1 to align the bottom of the camera's field of view with the bottom of the document. In addition, the larger the angle the more surface space is needed to deploy the stand for imaging. This embodiment of my scanning stand has the angle between platforms around 72° as a result of the length of beams 5—33 cm and height of the platforms—28 cm.

FIG. 10 illustrates that distance 14 between the lens of digital camera 7 and the imaging surface has direct impact on the maximum size of a document that can be scanned. In this embodiment of my scanning stand with platforms' dimensions 33 cm wide by 28 cm high with beams 5 that are 33 cm long distance 14 is about 27 cm. This is sufficient for scanning documents up to US letter size and international A4 size using digital cameras with the horizontal angle of view equal to 60° or more. In general terms the relation between distance 14, the horizontal angle of view and maximum width of a document is described by a formula:

$$2*D14*\tan(HAV/2)=MAX$$

D14 is distance 14, HAV is the horizontal angle of view and MAX is the max width.

Figure 2A:
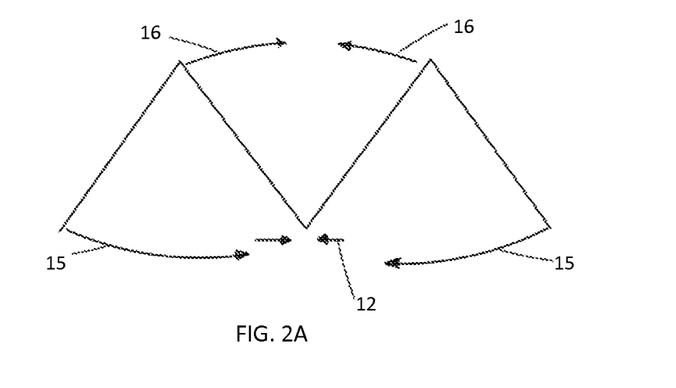
FIG. 2A is a schematic diagram illustrating folding for storage or travel

FIG. 2A illustrates folding of this embodiment of my scanning stand for storage. During folding, gap 12 between platforms 2 and 3 is closed. Then gaps between outside platforms 15 are closed. Finally gap 16 between tops of platforms 2 and 3 is closed. A small gap is left between platforms 2 and 3 to create a pocket for storing and securing a sheet of acrylic or tempered glass used during scanning books and wrinkled documents. This embodiment of the stand may be secured from un-folding using nylon ribbons or elastic bands.

Figure 2B:
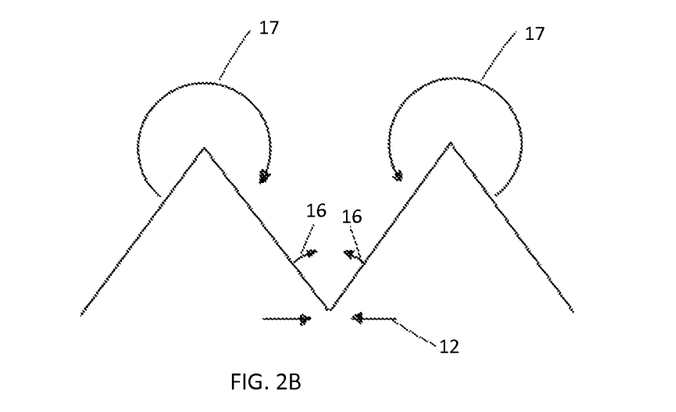
FIG. 2B is a schematic diagram illustrating another way of folding for storage or travel.

FIG. 2B illustrates an alternative way 17 of folding outside platforms.

Figure 2C:
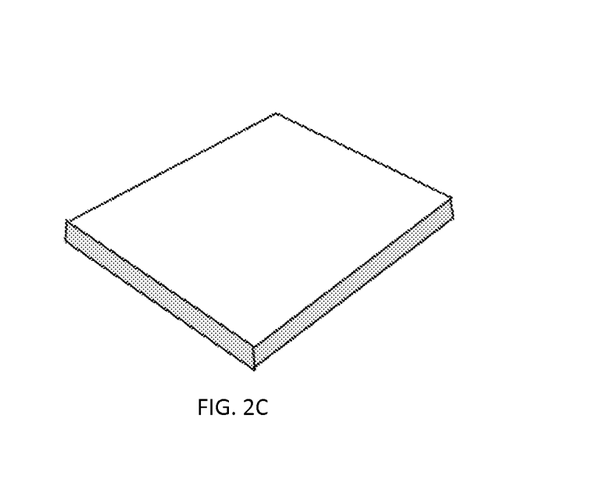
FIG. 2C is a perspective view of the first embodiment after folding.

FIG. 2C illustrates this embodiment of the stand folded. This embodiment of my scanning stand folds to a flat object 33 cm wide by 28 cm high. The folded thickness of this embodiment of the scanning stand depends on the thickness of the material used in its construction—total thickness of 2.5 cm or less is achievable.

Figure 3A:
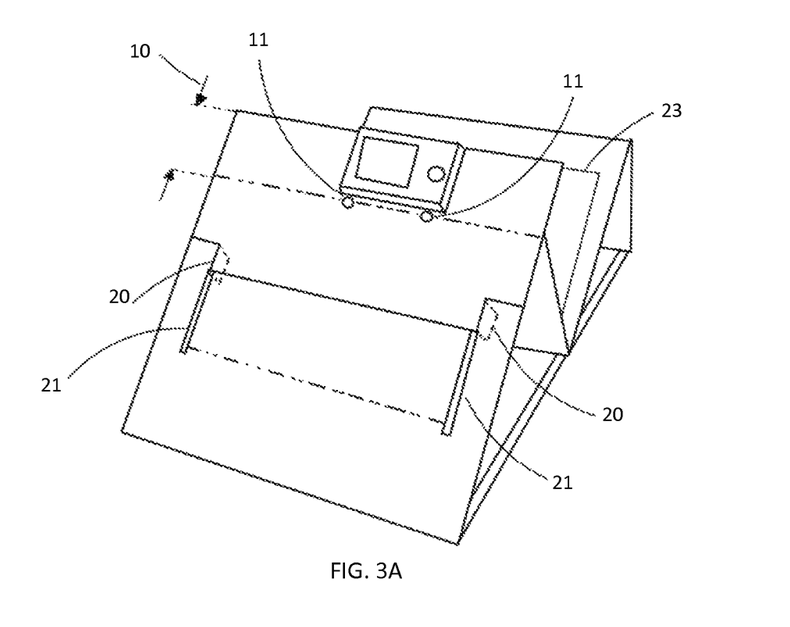
FIG. 3A is a front perspective view of the first embodiment showing a sliding platform for placing a digital camera.

FIG. 3A illustrates the sliding platform for holding a device equipped with a digital camera. Pegs 11 hold the device equipped with a digital camera in place and secure it from sliding down. The sliding movement 10 allows adjusting the camera position without the need to move pegs 11. Tabs 20 fit snugly in slots 21 to allow movement of the sliding platform up and down, but at the same time prevent from unwanted sliding down or out due to the weight of the camera.

Figure 3B:
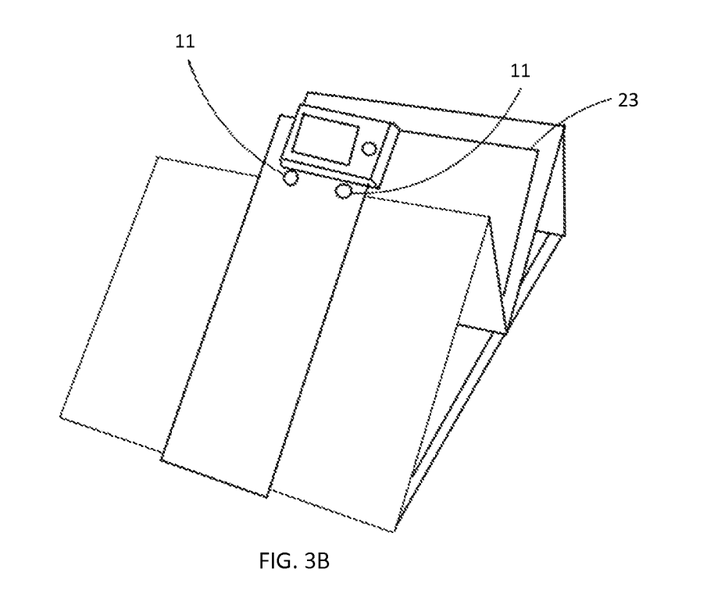
FIG. 3B is a front perspective view of the second embodiment showing a platform for placing a digital camera.
Figure 3C:
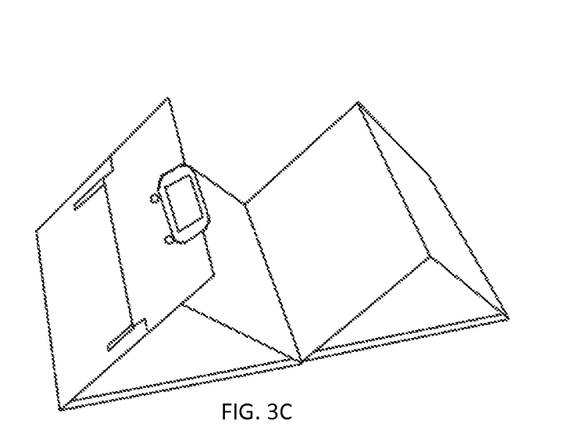
FIG. 3C shows a perspective side view of the first embodiment with a smart phone.
Figure 3D:
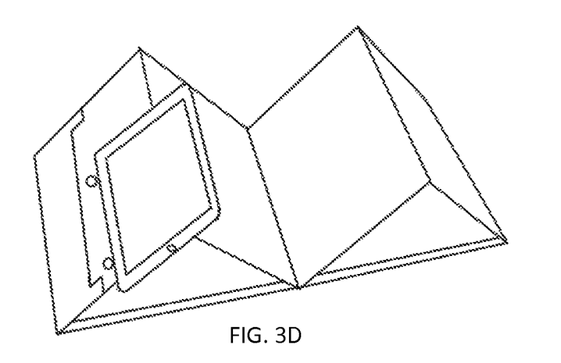
FIG. 3D shows a perspective side view of the first embodiment with a tablet.
Figure 3E:
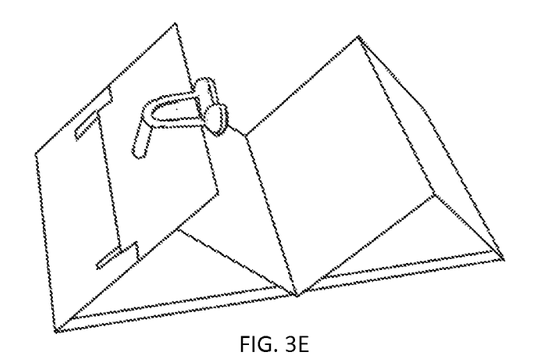
FIG. 3E shows a perspective side view of the first embodiment with a web-cam.
Figure 3F:
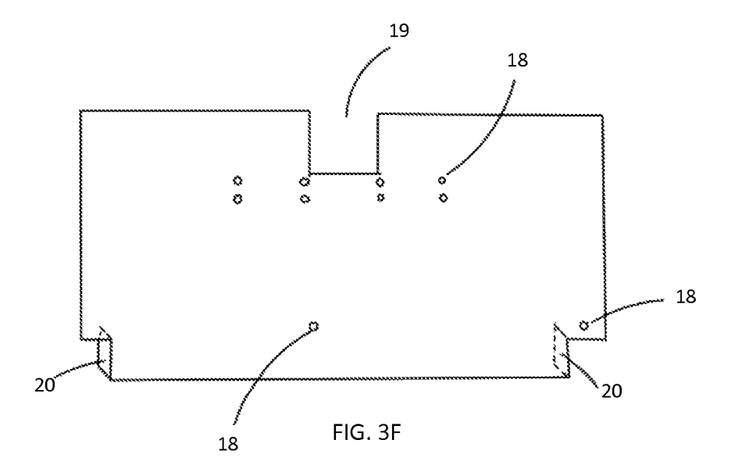
FIG. 3F is a front side view of a sliding platform for placing a digital camera on the stand as used in the first embodiment.

FIG. 3F shows holes 18 in various places of the sliding platform 9 where pegs can be inserted. Placement of holes 18 is designed to support devices of various sizes. For instance, the holes close to the bottom of platform 9 are designed for placing a tablet equipped with a digital camera. The sliding platform has the cut-out 19 that allows using digital cameras with zoom lenses.

FIG. 3C, FIG. 3D and FIG. 3E illustrate the use of this embodiment with different types of devices equipped with a digital camera. FIG. 3C demonstrates a smart phone placed on the scanning stand. FIG. 3D demonstrates a tablet on the scanning stand. FIG. 3E demonstrates a web-cam on the scanning stand.

Operation

FIGS. 4A, 4B, 4C, 4D, 4E

Figure 4A:
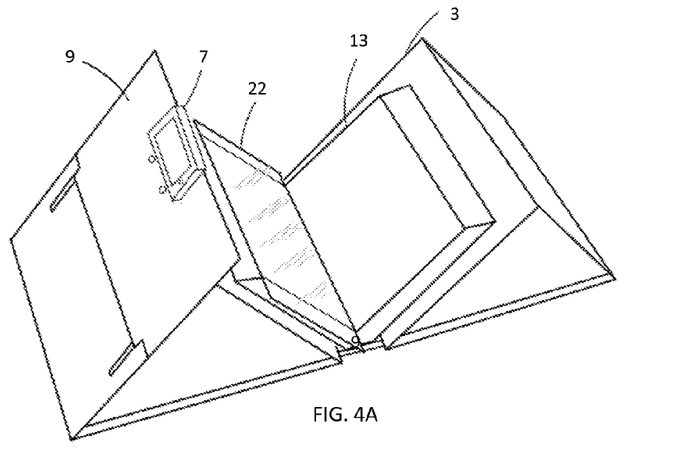
FIG. 4A is a perspective view illustrating the method for scanning books.
Figure 4B:
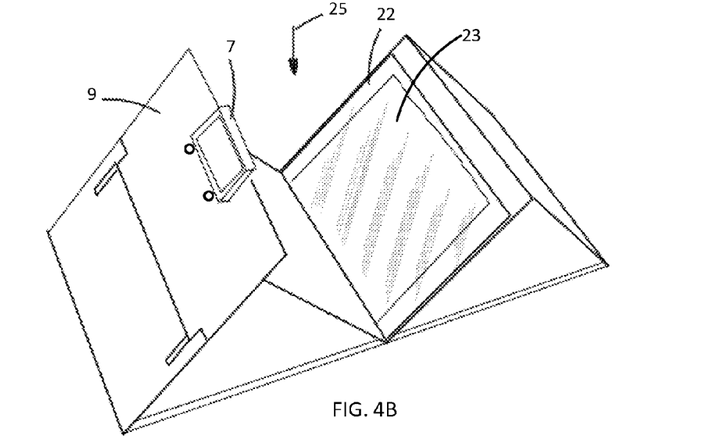
FIG. 4B is a perspective view illustrating the method for scanning documents that are wrinkled or that have creases.
Figure 4C:
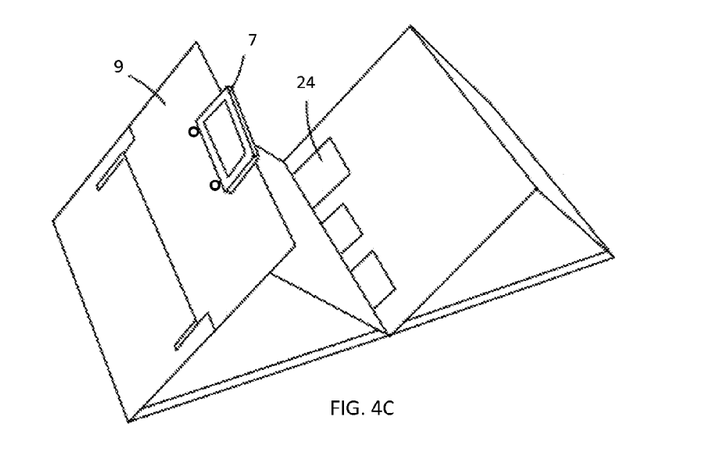
FIG. 4C is a perspective view illustrating the method for scanning small documents like business cards, driving licenses, checks or receipts.
Figure 4D:
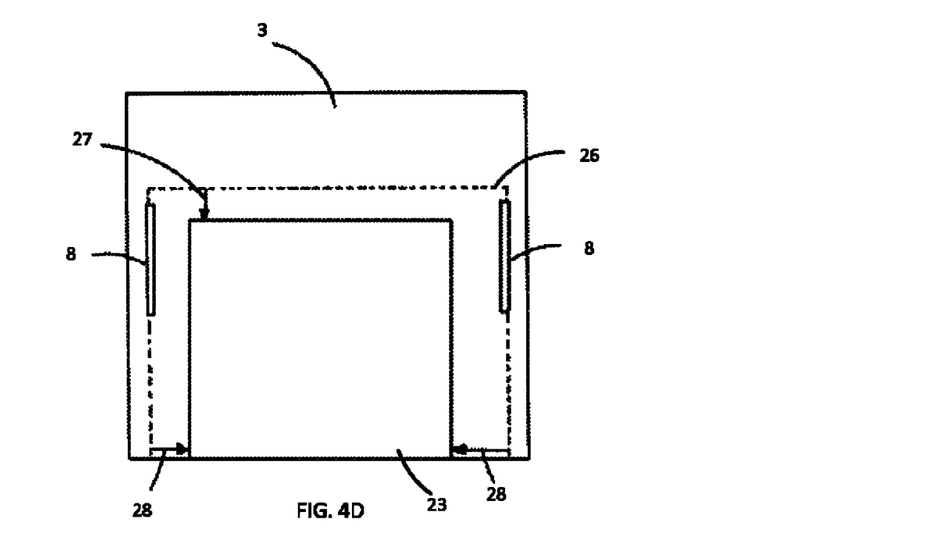
FIG. 4D is a schematic view illustrating placement of the document on the scanning stand.
Figure 4E:
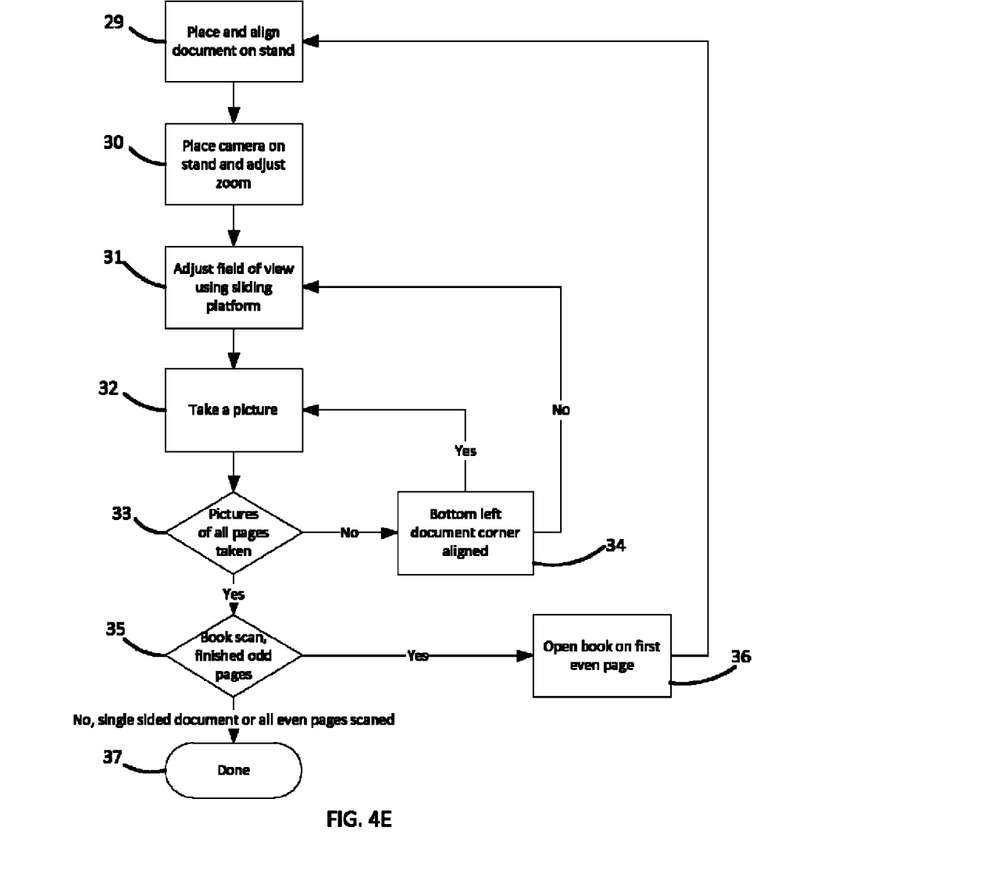
FIG. 4E is a flow-chart illustrating the process for scanning single-sided and double-sided documents.

FIG. 4E summarizes the process of imaging single-sided or double-sided, bound or unbound documents using this embodiment of my scanning stand. This process is described below in detail.

FIG. 4D illustrates some concepts used in the description: field of view 26, searching for left and right edges 28, searching for the top edge 27.

In first step 29, document 23 is placed on this embodiment of my scanning stand between left and right ribbons 8.

In second step 30 a digital camera is placed on sliding platform 9 and the camera's zoom is adjusted. Field of view 26 of the camera's lens should cover as much as possible the width from the left edge of ribbon 8 on the left side of imaging surface 3 to the right edge of ribbon 8 on the right side of imaging surface 3. In this embodiment the width between outside edges of ribbons 8 is 30.5 cm, this width was chosen to support scanning of documents up to US letter size or the international A4 size. In most digital cameras the zoom adjustment is done in discrete steps, nevertheless the setting closest to covering the width between edges of ribbons 8 is the best choice.

In third step 31, the camera position is adjusted using the sliding platform 9 to align the bottom edge of the camera's lens field of view 26 with the bottom of page 23.

In next step 32 images of document pages are captured. A sheet of transparent acrylic or tempered glass is included with this embodiment of my scanning stand to facilitate imaging of bound documents or pages with wrinkles or creases. The pages are turned from imaging surface 3 to turning surface 2 to facilitate scanning documents with many pages.

FIG. 4A illustrates imaging of a book with a sheet of acrylic or tempered glass 22 lightly pressed down to the side of the book 13 resting on turning surface 2. As a result, the page of the book 13 resting on imaging surface 3 becomes more flat and the digital camera 7 can take a picture that is better for scanning purposes.

FIG. 4B illustrates imaging of pages with creases or wrinkles. A sheet of transparent acrylic or tempered glass 22 is placed on top of page 23 to flatten its surface—as a result digital camera 7 can take a picture that is better for scanning purposes. Direction of light 25 is important to reduce the amount of glare from transparent sheet 22. An overhead light source gives good scanning results because the light is reflected at the angle that does not cause much glare in the direction of digital camera 7.

FIG. 4C illustrates imaging of small items 24—business cards, driver licenses, receipts etc. If several small items are scanned at once, the item with biggest height should be placed in the left-most position to crop the image height properly using the cropping algorithm explained below.

During imaging of documents containing many pages, the bottom edge of the document page and the bottom edge of the field of view of camera's lens require re-alignment 34 every 50 pages or so by moving sliding platform 9 up to compensate for bigger distance from the page resulting from turning several pages since last adjustment.

With regards to imaging double-sided documents this embodiment is designed to capture images of all odd pages of the document first. Once all odd pages are captured 35, the document is opened on the first even page 36 to capture images of all even pages of the document. For documents with side-binding (e.g. books) this means that the document needs to be also rotated 180°. For documents with top binding (some notebooks), rotation is not necessary. When capturing of all document pages is completed 37, computer software is used to process captured images.

The following few paragraphs explain how the properties of this embodiment of my scanning stand simplify computer software for processing captured images.

When capturing double-sided documents, computer software re-orders and rotates all images automatically based on user selection of side-binding or top-binding of double-sided document.

In addition, computer software applies image rotation automatically to all document pages according to the rotation of the first page of the document. For instance, if the first page of the document needs to be rotated 90° clockwise, all remaining pages of the same document also need to be rotated 90° clockwise.

The placement of the document and adjustment of the field of view of camera's lens as explained above simplifies automatic cropping and re-sampling of the captured images by computer software.

Cropping of the captured page out of the background is simplified because the bottom edge of the page is aligned with the bottom of the captured image and because imaging surface 3 in this embodiment is matte black in color. Search for the left edge 28 of the page is performed near the bottom of the image by looking for the first group of non-black pixels, allowing a predetermined threshold for identifying black pixels, starting from the left edge of the captured image. Similarly, search for the right edge 28 of the page is performed near the bottom of the image by looking for the first group of non-black pixels starting from the right edge of the captured image. Search for the top edge 27 is done in the vertical strip of the captured image close to the left edge of the page.

Re-sampling of document images to, for instance, 200 dots per inch is easily done by computer software because the captured image covers the predetermined distance between ribbons 8—that is 30.5 cm (about 12 inches) for this embodiment. Each pixel of the image represents a square with sides approximately equal to 30.5 cm divided by the number of pixels in the horizontal line of the captured image. As a result the width and the height of document page 23 can be calculated by multiplying the corresponding width and height of the page in pixels by the calculated size of one pixel. Re-sampling of the image is important for applications where real dimensions of the object are needed to render a copy of the document properly. One example of such an application is internet faxing.

FIGS. 3A, 3F

Additional Embodiments

FIG. 3B illustrates the second embodiment with a different type of platform for holding a device equipped with a digital camera. Pegs 11 hold the device equipped with a digital camera in place.

Figure 3G:
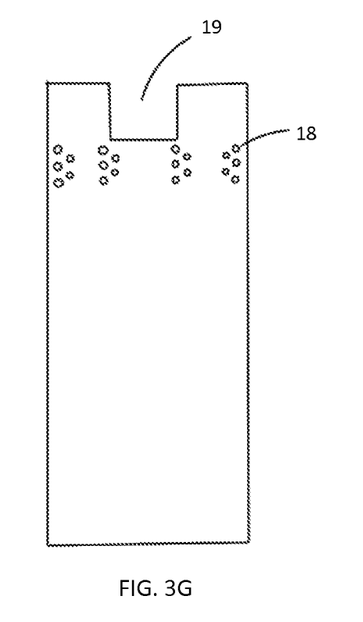
FIG. 3G is a front side view of the platform for placing a digital camera on the stand as used in the second embodiment.

FIG. 3G demonstrates several rows of holes 18 to allow optimal position for inserting pegs based on the size of the device and required position of camera's lens. Cut-out 19 allows using digital cameras with zoom lenses. This embodiment supports adjustment of camera's lens field of view by moving the pegs 11 up or down to a different row of holes on the platform.

Advantages

From the description above, a number of advantages of some embodiments of my scanning stand become evident:
(a) A wide range of devices equipped with auto-focus digital cameras can be used, including cell phones, tablets and web-cams.
(b) Scanning of both bound and unbound documents is supported.
(c) My scanning stand is foldable for storage or travel.
(d) My scanning stand can be constructed using inexpensive materials with less labor than prior art examples of scanning stands.
(e) The method for imaging of bound and unbound documents of various sizes is more practical than in previous art examples because it addresses a wide range of devices and a wide range of document types.
(f) One or more aspects allow designing computer software in a manner that requires less computing power to process captured images of documents and removes mundane tasks that require software users' attention.

Conclusion, Ramifications and Scope

Accordingly, the reader will see that the scanning stand of the various embodiments can be used efficiently to scan single-sided and double-sided documents of various thicknesses, both bound and unbound and that it can be folded for storage and travel. In addition images of documents can be captured using various types of devices equipped with a digital camera. Furthermore, the scanning stand has additional advantages in that:
  it can be manufactured using inexpensive materials like foam board, mat board or plastic;
  it enables practical methods for imaging of bound and unbound documents using various devices equipped with an autofocus digital cameras, including cell phones, tablets and web-cams;
  it allows to design more efficient computer software for processing images of documents;

Although the description above contains much specificity, it should not be construed as limiting the scope of the embodiments but as merely providing illustration of some of the presently preferred embodiments. Here are some examples of modifications:
  the scanning stand can use different ways of holding the digital camera in place, such as elastic bands, materials with a high coefficient of friction, spring-based holding mechanism etc.;
  the size of the stand can be changed to allow scanning documents larger in format or in order to use cameras with a narrower horizontal angle of view;
  the width of the opening between inverted-V parts of the stand can be adjusted using Velcro strips etc.;
  sliding platform can use different means for attachment to the inverted-V part such as strong magnets, pegs, clasps etc.;
  only the imaging surface and the turning surface need to be solid surfaces, the remaining sides of the inverted-V parts can be made of wire etc.;

Thus the scope of the embodiments should be determined by the appended claims and their legal equivalents, rather than by the examples given.

I claim:

1. A scanning stand for imaging bound and unbound documents, comprising:
   (a) two inverted-V parts wherein the body of each said part has at least one surface and a hinged connection at the top and said hinged connection opens to form the same angle in both said parts and said angle that said hinged connection opens to is between 60 and 90 degrees,
   (b) a holder for a device equipped with a digital camera wherein said holder has the ability to hold bodies of various devices equipped with a digital camera in parallel to the imaging surface and said devices include cell phones, tablets and webcams,
   (c) a connecting element that attaches said holder to at least one said part wherein said part with said holder attached to it becomes the holding part,
   (d) a surface on the second inverted-V part for placing a document wherein said surface becomes the imaging surface and said second inverted-V part becomes the imaging part,
   (e) a surface on the first inverted V part for turning pages of said document wherein said surface becomes the turning surface,
   whereby when a device equipped with a digital camera is placed in said holding part, the body of said device is parallel to said imaging surface and the distance between the lens of said camera and the imaging surface is suitable for capturing images of document pages without the need for time consuming adjustments.

2. A scanning stand of claim 1, wherein the distance between bases of said imaging surface and said turning surface can be adjusted to match a document by setting said distance to the thickness of said document.

3. A scanning stand of claim 1, wherein the position of said device equipped with a digital camera placed in said holding part can be adjusted such that:
   (a) the vertical center line of camera's lens field of view is aligned with the vertical center line of said imaging surface, and
   (b) the bottom of said field of view is aligned with the bottom of a document page on said imaging surface.

4. A scanning stand of claim 1, wherein said imaging surface has vertical markers near its left and right edges that allow adjusting the width of the camera lens's field of view to match approximately a predetermined distance between said markers by selecting the zoom setting in the camera.

5. A scanning stand of claim 1, wherein said imaging surface has a horizontal marker approximately near its top that allows adjusting the height of the camera lens's field of view to match approximately a predetermined distance between the bottom of said imaging surface and said marker by selecting a zoom setting in the camera.

6. A scanning stand of claim 1, wherein said holder contains an opening that, providing said camera has a zoom lens, allows the zoom lens of said camera to extend without affecting the position of the body of said camera.

7. A scanning stand of claim 1, wherein bodies of said inverted-V parts after closing said hinged connection become flat parts which are easier to store and a sheet of solid transparent material placed between said flat parts is protected from damage or scratches.

\* \* \* \* \*